United States Patent
Welsh et al.

(10) Patent No.: US 6,544,450 B2
(45) Date of Patent: Apr. 8, 2003

(54) PROCESS FOR PRODUCING THERMOFORMABLE FOAM SHEET USING A PHYSICAL BLOWING AGENT

(75) Inventors: Gary C. Welsh, Midland, MI (US); Michael Ballot, JC Terneuzen (NL); Roldolfo J. Salmang, JB Terneuzen (NL)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 10/004,574

(22) Filed: Dec. 4, 2001

(65) Prior Publication Data

US 2002/0121716 A1 Sep. 5, 2002

Related U.S. Application Data

(63) Continuation-in-part of application No. 09/759,580, filed on Jan. 12, 2001, now abandoned.

(60) Provisional application No. 60/180,446, filed on Feb. 4, 2000.

(51) Int. Cl.$^7$ .................................................. C08J 9/00
(52) U.S. Cl. ............................ 264/50; 264/51; 264/53; 264/288.8; 521/79; 521/97; 521/142; 521/143; 521/146
(58) Field of Search ............................ 264/50, 51, 53, 264/288.8; 521/79, 97, 142, 143, 146

(56) References Cited

U.S. PATENT DOCUMENTS

| 3,871,897 A | 3/1975 | Ealding |
| 5,179,166 A | 1/1993 | Demirörs |
| 5,250,577 A | 10/1993 | Welsh |
| 5,340,844 A | 8/1994 | Welsh et al. |
| 5,342,560 A | 8/1994 | Sturm et al. |

*Primary Examiner*—Morton Foelak

(57) ABSTRACT

The present invention is a process for producing a thermoplastic foam sheet comprising contacting a molten monovinylidene aromatic or olefinic polymer with a physical blowing agent to form a polymer/blowing agent mixture, and foaming the mixture into a region of lower pressure within a sheet extrusion line, wherein the extrudate is pulled and compressed to form a thermoplastic foam sheet having a uniform thickness.

14 Claims, 1 Drawing Sheet

FIGURE I
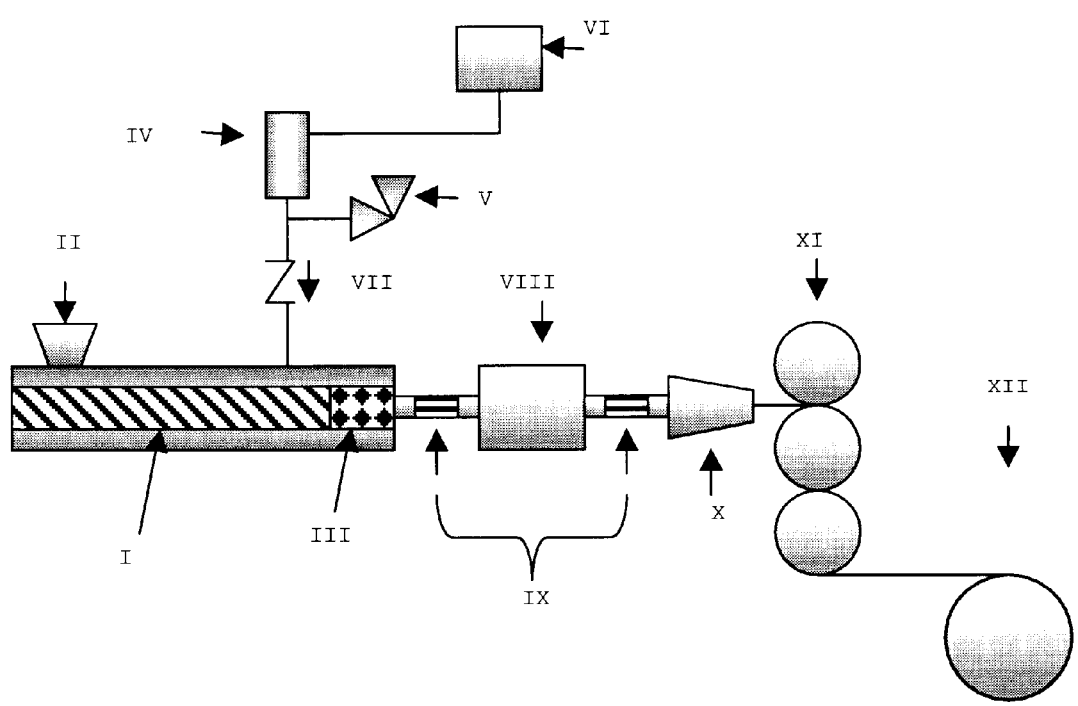

PROCESS FOR PRODUCING THERMOFORMABLE FOAM SHEET USING A PHYSICAL BLOWING AGENT

CROSS REFERENCE STATEMENT

This application claims the benefit of U.S. Provisional Application No. 60/180,446, filed Feb. 4, 2000 and is a continuation-in-part of U.S. application Ser. No. 09/759,580, filed Jan. 12, 2001, now abandoned.

The present invention relates to processes for producing foams using a physical blowing agent such as carbon dioxide, water and/or nitrogen.

BACKGROUND OF THE INVENTION

Styrenic and olefinic polymers have been utilized in food packaging applications such as non-foamed thermoformable sheet used in dairy containers and the like. This type of thermoformable sheet has been typically produced using a conventional sheet extrusion line, wherein the polymer is extruded from a flat sheet die onto a three-roll polishing stack and either wound or fed directly into a thermoforming process. However, ecological influences are driving the food packaging industry to produce lighter packaging materials, due to the fees based on packaging weight which are applied to packaged food processors.

One way to reduce the weight of a thermoformable sheet is to incorporate a blowing agent to produce a high density foam sheet. Foam sheet of this type is typically produced using a conventional sheet extrusion line and a chemical blowing agent. However, chemical blowing agents are expensive and do not provide consistent or uniform foaming, resulting in foam gauge and density variation within the foam sheet produced.

Therefore, there remains a need for a process of producing high density foamed packaging materials, particularly thermoformable foam sheet having consistent gauge and density, which can be used in traditional non-foam applications such as dairy containers.

SUMMARY OF THE INVENTION

The present invention is a process for producing a thermoplastic foam sheet comprising contacting a molten monovinylidene aromatic or olefinic polymer with a physical blowing agent to form a polymer/blowing agent mixture, foaming the mixture into a region of lower pressure, extruding the foaming mixture to form a foam sheet, pulling and compressing the sheet to form a foam sheet having a uniform thickness.

The present invention also includes the thermoplastic foam sheet made by the process described above, as well as thermoformed articles produced therefrom.

The process of the present invention is especially suited for producing high density foamed packaging materials, particularly thermoformable foam sheet having consistent gauge and density, which can be used in traditional non-foam thermoformed applications such as dairy containers.

DESCRIPTION OF THE DRAWING

FIG. I is a schematic representation of one embodiment of a sheet extrusion line used in the process of the present invention. Resin and optional nucleator (II) is fed into the extruder (I) having a mixing head (III), static mixers (IX), gear pump (VIII) and die (X), wherein a physical blowing agent, from a storage tank (VI) connected to a positive displacement pump (IV) having a relief device (V), is injected through the injection valve (VII) of the extruder. The foam sheet is pulled and compressed into the 3-roll polishing stack (XI) and wound to form a bolt of foamed sheet (XII).

DETAILED DESCRIPTION OF THE INVENTION

Thermoplastic polymers useful in the present invention include polyolefins such as polyethylene, polypropylene, linear low density polyethylene, low density polyethylene, high density polyethylene, olefinic copolymers such as ethylene-octene copolymers and the like; polymers, copolymers and interpolymers having at least 70 percent by weight vinyl aromatic monomer incorporated into the final resin as the monomeric repeat units. Vinyl aromatic monomers include, but are not limited to those described in U.S. Pat. Nos. 4,666,987, 4,572,819 and 4,585,825. Preferably, the monomer is of the formula:

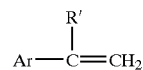

wherein R' is hydrogen or methyl, Ar is an aromatic ring structure having from 1 to 3 aromatic rings with or without alkyl, halo, or haloalkyl substitution, wherein any alkyl group contains 1 to 6 carbon atoms and haloalkyl refers to a halo substituted alkyl group. Preferably, Ar is phenyl or alkylphenyl, wherein alkylphenyl refers to an alkyl substituted phenyl group, with phenyl being most preferred. Typical vinyl aromatic monomers which can be used include: styrene, alpha-methylstyrene, all isomers of vinyl toluene, especially paravinyltoluene, all isomers of ethyl styrene, propyl styrene, vinyl biphenyl, vinyl naphthalene, vinyl anthracene and the like, and mixtures thereof. The vinyl aromatic monomers may also be combined with other copolymerizable monomers. Examples of such monomers include, but are not limited to acrylic monomers such as acrylonitrile, methacrylonitrile, methacrylic acid, methyl methacrylate, acrylic acid, and methyl acrylate; maleimide, phenylmaleimide, and maleic anhydride. In addition, the polymerization of the vinyl aromatic monomer may be conducted in the presence of predissolved elastomer to prepare impact modified, or grafted rubber containing products, examples of which are described in U.S. Pat. Nos. 3,123,655, 3,346,520, 3,639,522, and 4,409,369. Specifically, the polymer can be a high impact polystyrene resin. Additionally, the process of the present invention can utilize blends or combinations of any of the polymers mentioned above.

The blowing agent to be used in the process of the present invention includes any physical blowing agent, including but not limited to, carbon dioxide ($CO_2$), nitrogen ($N_2$), water ($H_2O$) or combinations thereof. For the purposes of this specification, such physical blowing agent shall be defined as substantially 100 percent physical blowing agent, in the absence of a chemical blowing agent, even though the physical blowing agent may contain minor impurities or minor amounts of other compounds. Preferably, the blowing agent is 100 percent carbon dioxide.

The physical blowing agent can be in any form and is preferably a gas or liquid. Carbon dioxide is preferably added to a polymer melt as a liquid, although use of the carbon dioxide gas would also be acceptable in the practice of the present invention. Nitrogen is preferably added to a polymer melt as a gas, while water is typically added as a liquid, although any form is acceptable. Typically, in cases of blowing agent combinations or mixtures, separate metering systems are utilized, wherein multiple streams meet prior to the injection point of the cast-extrusion process. However, the blowing agents can also be previously mixed and injected using a single metering system.

Additives, such as pigments and/or nucleating agents and the like, may also be used in the process of the present invention. The addition of a nucleating agent is generally preferred and it is preferably added in an amount of from about 0.001 to about 10 percent of the total polymer by weight. More preferably the amount of nucleating agent is between about 0.02 to about 2 percent. The nucleating agent is typically added with the polymer in the extruder. In one embodiment, the nucleating agent is talc.

The process of the present invention can also utilize coextrusion capabilities to produce multi-layer foam sheets. These multi-layer sheets can comprise one or more foamed core layers or foamed skin layers if desirable. In some applications, it may be desirable to have a combination of one or more foamed core layers or skin layers with non-foamed core layers or skin layers as well. For example, in one embodiment, a multilayer coextruded sheet comprises a foamed polystyrene core layer having outer skin layers comprising a non-foamed high impact polystyrene or a non-foamed blend of a polystyrene resin with a high impact polystyrene resin. Methods of coextruding are well known in the art.

Sheet extrusion is well known in the art and described in F. Hensen, Plastics Extrusion Technology, Hanser Publishers, New York, 1988, Chapter 7, pages 203–251 and in Modern Plastics Mid-October 1989 Encyclopedia Issue, Volume 66, Number 11, pages 256–257.

A sheet extrusion process used in the process of the present invention comprises feeding and melting a polymer in a sheet extruder, wherein the melt travels to an optional feedblock and through a die to form a monolayer or multi-layer extrudate (sheet) of uniform thickness at the die exit. The foaming temperature at the die in the process of the present invention, is dependent upon the polymer being foamed and is typically greater than 150° C. and is preferably between 170 and 300° C. The polymer/blowing agent mixture is extruded and foamed into a zone of lower pressure preferably air at atmospheric pressure. The extruded foam sheet is drawn into a mechanism for pulling and compressing the foaming extrudate such that uniform thickness of the sheet is obtained. One such mechanism includes a rotating, temperature controlled 3-roll polishing stack. In this embodiment, the gauge of the sheet is determined by the extrusion rate, roll stack gap, line speed, and draw ratio. The roll stack gap is the clearance between the top and middle roll of the 3-roll polishing stack when using down stack configuration. The draw ratio is the ratio of the speed of the melt at the die exit to the speed of the 3-roll polishing stack. The gauge of the sheet is monitored by an instrument mounted on a carriage that moves perpendicular to the sheet direction, carrying the gauge instrument across the sheet. Such gauge instruments are well known in the art. The sheet exits the gauging station and moves over a series of guide rollers to the optional slitting station and onto a winder or directly into a thermoforming process.

The process of the present invention is further characterized in that the physical blowing agent is introduced into the polymer melt at a location prior to the die of the sheet extruder. Preferably, the blowing agent is injected through a one way valve located at the decompression zone (vent port) of the extrusion screw within the sheet extrusion line. Optionally, a static mixer may be provided prior to the die to mix the polymer with the blowing agent(s) and nucleating agent, if utilized. The foaming occurs in a region of lower pressure just prior to the die exit and continues once the polymer melt mixture exits from the die. Typically, sheet extrusion processes are utilized to extrude non-foamed materials or chemically blown high density foam sheet. It has been discovered that by utilizing a physical blowing agent and a sheet extrusion line as described, a high density foam sheet can be obtained having improved gauge and density uniformity.

The foam sheet produced will typically have a density in the range of from 250 grams/liter(g/L), preferably from about 300 g/L, more preferably from about 400 g/L and most preferably from about 727 g/L to about 1050 g/L, more preferably to about 890 (g/L), and about 0.04 to about 1 weight percent, preferably about 0.04 to about 0.5 weight percent of physical blowing agent, is used based on the weight of polymer. It should be noted that when water is used in the process of the present invention in amounts less than about 0.2 weight percent based on the weight of the polymer, water acts as a coolant and does not provide expansion of the polymer. The cooling effect is advantageous in controlling the expansion rate of the foaming structure. In amounts greater than 0.2 weight percent water, increased expansion of the polymer melt mixture is observed. Cell sizes of the foamed sheet in all directions are less than 1 millimeter (mm), and preferably less than about 0.5 mm. The thickness of the foam sheet is generally from about 0.1 mm to less than about 15 mm, typically less than 10 mm, preferably less than 8 mm, more preferably less than 6 mm, and most preferably less than 3 mm.

The foam sheet produced has improved gauge and density uniformity. Uniform gauge can be determined by comparing the thickness of the finished sheet at any location to the average finished sheet thickness. The two thicknesses, when compared will have a difference of less than 6 percent. Uniform density can be determined by comparing the density of the finished sheet at any location to the average sheet density. The two densities, when compared will have a difference of less than 4 percent. In other words, any gauge measured on the finished sheet will not differ by more than 6 percent from the average sheet gauge and any density measured on the finished sheet will not differ by more than 4 percent from the average finished sheet density.

The following examples are provided to illustrate the present invention. The examples are not intended to limit the scope of the present invention and they should not be so interpreted. Amounts are in weight percentages unless otherwise indicated.

EXAMPLES

Example I

A general purpose polystyrene resin, having a Mw of 320,000 is fed into a sheet coextrusion line having a high pressure piston pump at the vent port location, wherein 100 percent $CO_2$ is metered into the extrusion barrel as a blowing agent. The end of the extruder is also equipped with static mixers to improve the mixing of the polymer/blowing agent mixture. Simultaneously, a 50/50 blend of the polystyrene resin with an impact modified polystyrene resin is fed into another sheet extrusion line without blowing agent, for production of the coextruded solid skin layers. The polystyrene resin is foamed and coextruded with the non-foamed polystyrene/HIPS blend to form a sheet having a foamed core resin with two solid skin layers adhered to both sides of the core resin layer. The sheet is pulled and compressed by a 3-roll polishing stack. Process conditions and sheet properties are given below:

| Parameter | Value |
|---|---|
| $CO_2$ (Weight percent) | 0.1 |
| nucleating agent (talc) (ppm) | 1000 |
| Die foaming temperature, (° C.) | 200 |
| Sheet core density, (g/cc) | 0.62 |
| Overall sheet density, (g/cc) | 0.83 |
| Overall sheet gauge, (mm) | 1.4 |
| Overall sheet weight reduction, (percent) | 20 |
| Individual skin layer gauge (mm) | 0.35 |

What is claimed is:

1. A process for producing a thermoplastic foam sheet comprising:

contacting a molten monovinylidene aromatic or olefinic polymer with a physical blowing agent to form a polymer/blowing agent mixture within a sheet extrusion line, foaming the mixture into a region of lower pressure to form a foaming extrudate, and pulling and compressing the foaming extrudate to form a foam sheet having a uniform thickness.

2. The process of claim 1 wherein a molten monovinylidene aromatic polymer is used.

3. The process of claim 2 wherein the molten monovinylidene aromatic polymer comprises a vinyl aromatic polymer.

4. The process of claim 1 wherein a molten olefinic polymer is used.

5. The process of claim 4 wherein the molten olefinic polymer comprises a polyethylene, polypropylene, linear low density polyethylene, low density polyethylene, high density polyethylene, an ethylene-octene copolymer, or an olefinic copolymer or interpolymer having at least 70 percent by weight vinyl aromatic monomer incorporated into the final resin as the monomeric repeat units.

6. The process of claim 5 wherein the molten olefinic polymer comprises polypropylene.

7. The process of claim 5 wherein the molten olefinic polymer comprises polyethylene.

8. The process of claim 1 wherein the physical blowing agent is carbon dioxide, nitrogen, water or a combination thereof.

9. The process of claim 1 wherein the density of the foam is from 250 to 1050 g/L.

10. The process of claim 9 wherein the density of the foam is from 725 to 890 g/L.

11. The process of claim 1 wherein the uniform thickness is less than 15 mm mm.

12. The process of claim 1 wherein the uniform thickness is less than 10 mm mm.

13. The process of claim 1 wherein the uniform thickness is less than 6 mm.

14. The process of claim 1 wherein the uniform thickness is less than 3 mm.

* * * * *